US011176459B2

(12) United States Patent
Frayman et al.

(10) Patent No.: US 11,176,459 B2
(45) Date of Patent: *Nov. 16, 2021

(54) EXTRACTING ENCRYPTION METADATA AND TERMINATING MALICIOUS CONNECTIONS USING MACHINE LEARNING

(71) Applicant: Cujo LLC, El Segundo, CA (US)

(72) Inventors: Yuri Frayman, Miami, FL (US); Robert Beatty, Lauderhill, FL (US); Leonid Kuperman, Los Angeles, CA (US); Gabor Takacs, Gyor (HU)

(73) Assignee: Cujo LLC, Walnut, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/569,080

(22) Filed: Sep. 12, 2019

(65) Prior Publication Data
US 2020/0007568 A1 Jan. 2, 2020

Related U.S. Application Data

(63) Continuation of application No. 15/798,893, filed on Oct. 31, 2017, now Pat. No. 10,454,961.
(Continued)

(51) Int. Cl.
H04L 29/00 (2006.01)
G06N 5/00 (2006.01)
(Continued)

(52) U.S. Cl.
CPC ............ *G06N 5/003* (2013.01); *G06N 20/00* (2019.01); *G06N 20/20* (2019.01);
(Continued)

(58) Field of Classification Search
CPC ............ H04L 63/1425; H04L 12/2834; H04L 12/2825; H04L 63/06; H04L 12/2827;
(Continued)

(56) References Cited

U.S. PATENT DOCUMENTS 8,677,466 B1 *  3/2014  Chuang ................... H04L 9/321
                                                                726/9
9,009,820 B1 *  4/2015  McDougal ............ G06F 21/567
                                                                726/22

(Continued)

OTHER PUBLICATIONS

Markey, et al. "Using Decision Tree Analysis for Intrusion Detection: A How-To Guide—GIAC" Internet source: https://www.giac.org/paper/gcia/6498/decision-tree-analysis-intrusion-detection-how-to-guide/123230. Jun. 5, 2011. 33 pages. (Year: 2011).*

(Continued)

*Primary Examiner* — Don G Zhao
(74) *Attorney, Agent, or Firm* — Withrow & Terranova, PLLC

(57) ABSTRACT

A network traffic hub extracts encryption metadata from messages establishing an encrypted connection between a smart appliance and a remote server and determines whether malicious behavior is present in the messages. For example, the network traffic hub can extract an encryption cipher suite, identified encryption algorithms, or a public certificate. The network traffic hub detects malicious behavior or security threats based on the encryption metadata. These security threats may include a man-in-the-middle attacker or a Padding Oracle On Downgraded Legacy Encryption attack. Upon detecting malicious behavior or security threats, the network traffic hub blocks the encrypted traffic or notifies a user.

9 Claims, 5 Drawing Sheets

Related U.S. Application Data

(60) Provisional application No. 62/416,683, filed on Nov. 2, 2016, provisional application No. 62/477,374, filed on Mar. 27, 2017.

(51) Int. Cl.

| | | |
|---|---|---|
| *G06N 20/00* | (2019.01) | |
| *H04L 29/06* | (2006.01) | |
| *H04L 12/46* | (2006.01) | |
| *G06N 20/20* | (2019.01) | |
| *H04W 12/082* | (2021.01) | |
| *H04W 12/088* | (2021.01) | |
| *H04B 10/114* | (2013.01) | |
| *H04L 12/28* | (2006.01) | |
| *G06N 3/08* | (2006.01) | |
| *G06N 20/10* | (2019.01) | |

(52) U.S. Cl.
CPC ...... *H04B 10/1149* (2013.01); *H04L 12/2825* (2013.01); *H04L 12/2827* (2013.01); *H04L 12/2834* (2013.01); *H04L 12/4625* (2013.01); *H04L 63/0428* (2013.01); *H04L 63/06* (2013.01); *H04L 63/0823* (2013.01); *H04L 63/1416* (2013.01); *H04L 63/1425* (2013.01); *H04L 63/20* (2013.01); *H04W 12/082* (2021.01); *H04W 12/088* (2021.01); *G06N 3/08* (2013.01); *G06N 20/10* (2019.01)

(58) Field of Classification Search
CPC ............. H04L 12/4625; H04L 63/0428; H04L 63/0823; H04L 63/1416; H04L 63/20; G06N 20/00; G06N 20/20; G06N 5/003; G06N 3/08; G06N 20/10; H04W 12/088; H04W 12/082; H04B 10/1149
See application file for complete search history.

(56) References Cited

U.S. PATENT DOCUMENTS

| | | | |
|---|---|---|---|
| 9,419,942 B1 | 8/2016 | Buruganahalli et al. | |
| 9,787,710 B1* | 10/2017 | Rusakov | G06F 16/951 |
| 9,888,337 B1* | 2/2018 | Zalewski | H04W 76/14 |
| 10,045,217 B2* | 8/2018 | Stan | H04L 63/1416 |
| 10,454,961 B2 | 10/2019 | Frayman et al. | |
| 10,516,586 B2* | 12/2019 | Gandham | G06F 3/04847 |
| 10,666,640 B2* | 5/2020 | McGrew | H04L 63/0823 |
| 2008/0092181 A1* | 4/2008 | Britt | H04N 21/47202 725/87 |
| 2008/0162390 A1 | 7/2008 | Kapoor et al. | |
| 2010/0162395 A1* | 6/2010 | Kennedy | H04L 63/145 726/23 |
| 2011/0219450 A1* | 9/2011 | McDougal | H04L 63/1416 726/23 |
| 2011/0219451 A1* | 9/2011 | McDougal | H04L 63/1416 726/23 |
| 2012/0266245 A1* | 10/2012 | McDougal | G06F 21/567 726/24 |
| 2012/0330801 A1* | 12/2012 | McDougal | G06F 21/56 705/32 |
| 2012/0330863 A1* | 12/2012 | McDougal | G06Q 10/06 705/400 |
| 2013/0055338 A1* | 2/2013 | McDougal | G06F 21/56 726/1 |
| 2013/0074185 A1* | 3/2013 | McDougal | G06F 21/561 726/24 |
| 2013/0139260 A1* | 5/2013 | McDougal | G06F 21/567 726/23 |
| 2013/0145471 A1* | 6/2013 | Richard | G06F 21/562 726/24 |
| 2014/0101759 A1 | 4/2014 | Antonakakis et al. | |
| 2016/0173288 A1 | 6/2016 | Li et al. | |
| 2016/0180100 A1* | 6/2016 | Britt | G06F 21/36 726/27 |
| 2016/0182459 A1* | 6/2016 | Britt | H04L 63/18 713/171 |
| 2016/0197786 A1* | 7/2016 | Britt | H04L 43/0811 370/255 |
| 2016/0219024 A1* | 7/2016 | Verzun | H04L 63/0464 |
| 2016/0315909 A1 | 10/2016 | von Gravrock et al. | |
| 2017/0005390 A1* | 1/2017 | Zakaria | H04L 67/12 |
| 2017/0006643 A1* | 1/2017 | Zakaria | H04W 12/04 |
| 2017/0019873 A1* | 1/2017 | Britt | G06Q 30/0261 |
| 2017/0055148 A1* | 2/2017 | Zimmerman | H04L 9/0877 |
| 2017/0126704 A1* | 5/2017 | Premnath | G06F 21/56 |
| 2017/0169264 A1* | 6/2017 | Britt | H04L 9/3247 |
| 2017/0169640 A1* | 6/2017 | Britt | H04W 12/0401 |
| 2017/0171165 A1* | 6/2017 | Britt | G06F 21/64 |
| 2017/0171181 A1* | 6/2017 | Britt | H04L 63/0428 |
| 2017/0171196 A1* | 6/2017 | Britt | H04L 63/061 |
| 2017/0171314 A1* | 6/2017 | Britt | H04L 67/12 |
| 2017/0171607 A1* | 6/2017 | Britt | H04N 21/6125 |
| 2017/0171747 A1* | 6/2017 | Britt | H04L 63/061 |
| 2017/0264626 A1 | 9/2017 | Xu et al. | |
| 2017/0342741 A1* | 11/2017 | Holland | H04W 4/70 |
| 2017/0347264 A1* | 11/2017 | Holland | H04L 63/0823 |
| 2017/0351504 A1* | 12/2017 | Riedl | G06F 3/002 |
| 2017/0351505 A1* | 12/2017 | Riedl | G06F 3/002 |
| 2018/0013788 A1* | 1/2018 | Vissamsetty | H04L 63/08 |
| 2018/0027006 A1* | 1/2018 | Zimmermann | G06F 9/46 726/11 |
| 2018/0048710 A1* | 2/2018 | Altin | H04L 67/12 |
| 2018/0097788 A1* | 4/2018 | Murthy | H04L 63/102 |
| 2018/0097803 A1* | 4/2018 | Iwanir | H04L 63/0815 |
| 2018/0097840 A1* | 4/2018 | Murthy | H04L 63/02 |
| 2019/0190961 A1* | 6/2019 | McGrew | H04L 63/1425 |

OTHER PUBLICATIONS

Anderson, B. et al., "Identifying Encrypted Malware Traffic with Contextual Flow Data," AISec'16, ACM, Oct. 28, 2016, pp. 35-46.
International Search Report and Written Opinion for International Patent Application No. PCT/US2017/59523, dated Jan. 25, 2018, 16 pages.
Notice of Allowance for U.S. Appl. No. 15/798,893, dated Aug. 26, 2019, 9 pages.
Anderson, B. et al., "Deciphering Malware's use of TLS (without Decryption)," Arxiv.org, Cornell University Library, 201 Olin Library Cornell University, Ithaca, NY, 14853, Jul. 6, 2016, XP08012441, 15 pages.
Extended European Search Report for European Patent Application No. 17867120.2, dated Apr. 3, 2020, 8 pages.
International Preliminary Report on Patentability for International Patent Application No. PCT/US2017/59523, dated May 16, 2019, 9 pages.

* cited by examiner

EXTRACTING ENCRYPTION METADATA AND TERMINATING MALICIOUS CONNECTIONS USING MACHINE LEARNING

CROSS REFERENCE TO RELATED APPLICATION

This application is a continuation of U.S. patent application Ser. No. 15/798,893, "Extracting Encryption Metadata and Terminating Malicious Connections Using Machine Learning," filed Oct. 31, 2017, which claims the benefit priority to the U.S. Provisional Application No. 62/416,683, entitled "Extracting Encryption Metadata from Smart Appliances" and filed on Nov. 2, 2016 and U.S. Provisional Application No. 62/477,374, entitled "Extracting Encryption Metadata from Smart Appliances Using Machine Learning" and filed on Mar. 27, 2017, the content of each incorporated by reference in its entirety herein.

BACKGROUND

"Smart" appliances are devices that can connect to a network to communicate with other devices while performing a specific role (e.g. within a home or small office). Smart appliances have some specified basic computing processing intelligence but otherwise lack the capability of a full-fledged computing system such as a personal computer, phone, or tablet. Examples of smart appliances include televisions, refrigerators, dishwashers, washers, dryers, thermostats, digital video recorders, DVD players, and printers. By adding a certain level of intelligence to these devices, smart appliances can be made more effective or more convenient for the user. For example, a smart dishwasher might be able to communicate with a smartphone in the local network so the user can start the dishwasher from anywhere in a house.

Some smart appliances can communicate with devices outside of the local network. A smart appliance may receive software updates from a remote server to perform more effectively or it might receive information that it uses to perform more effectively. For example, a smart thermostat might receive information about the weather from an internet based weather service and use that information to adjust the heat settings of a house. The smart appliance might communicate with a specific server designated by the manufacturer, or it might communicate with third-party web servers via the internet.

However, smart appliances are vulnerable to security breaches that could embed code on the smart appliance that causes it to perform malicious behavior. For example, smart appliances infected with malicious code might be used to perform a Distributed Denial of Service (DDoS) attack on a remote web server or they could be used to send user information to unauthorized recipients. Due to limited access that users have to the functionality of smart appliances, it could be very difficult for a user to determine, on their own, whether a smart appliance is performing malicious behavior. Traditional approaches to protect networked devices from malicious code include anti-virus software installed on computers that monitors processes on the computer to determine if those processes might be exhibiting malicious behavior. Anti-virus software is typically installed on full-fledged computing systems such as personal computers, smartphones, and tablets. However, smart appliances do not have the computing intelligence or resources to support anti-virus software and often do not allow users to install additional software onto the smart appliance. Therefore, anti-virus software is ill-suited to protect smart appliances from being infected with malicious code. Moreover, anti-virus solutions continue to have difficulty in keeping up with new threats. For example, encryption is used to mask phishing, social engineering scams, malware command and control communication and malware delivery to and endpoint.

One potential solution is the intercept traffic sent to and from a smart appliance, and to analyze the traffic for malicious behavior using deep packet inspection (DPI), wherein a system analyzes the actual content or "payload" of a packet. However, DPI is resource intensive, requiring the system to store one or more packets sent from the smart appliance and to analyze those packets before sending them to their intended destination, which increases the latency of communication through the local network of the computing system. Additionally, if the traffic to or from the smart appliance is encrypted, DPI must decrypt the communication through a man-in-the-middle attack, which impairs the security of the data stored in the smart appliance's communication. Furthermore, performing a man-in-the-middle attack can be difficult. For example, unless a root certificate is installed on the smart appliance or the smart appliance ignores TLS or SSL errors, it is not possible to perform a man-in the-middle attack to perform DPI. Additionally, if the smart appliance uses "Certificate Pinning" or certificate validation techniques to ensure that the certificate provided by the remote server is valid, then it is not possible to use man-in-the-middle attacks and perform DPI to determine malicious traffic.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

DETAILED DESCRIPTION

Figure 1:
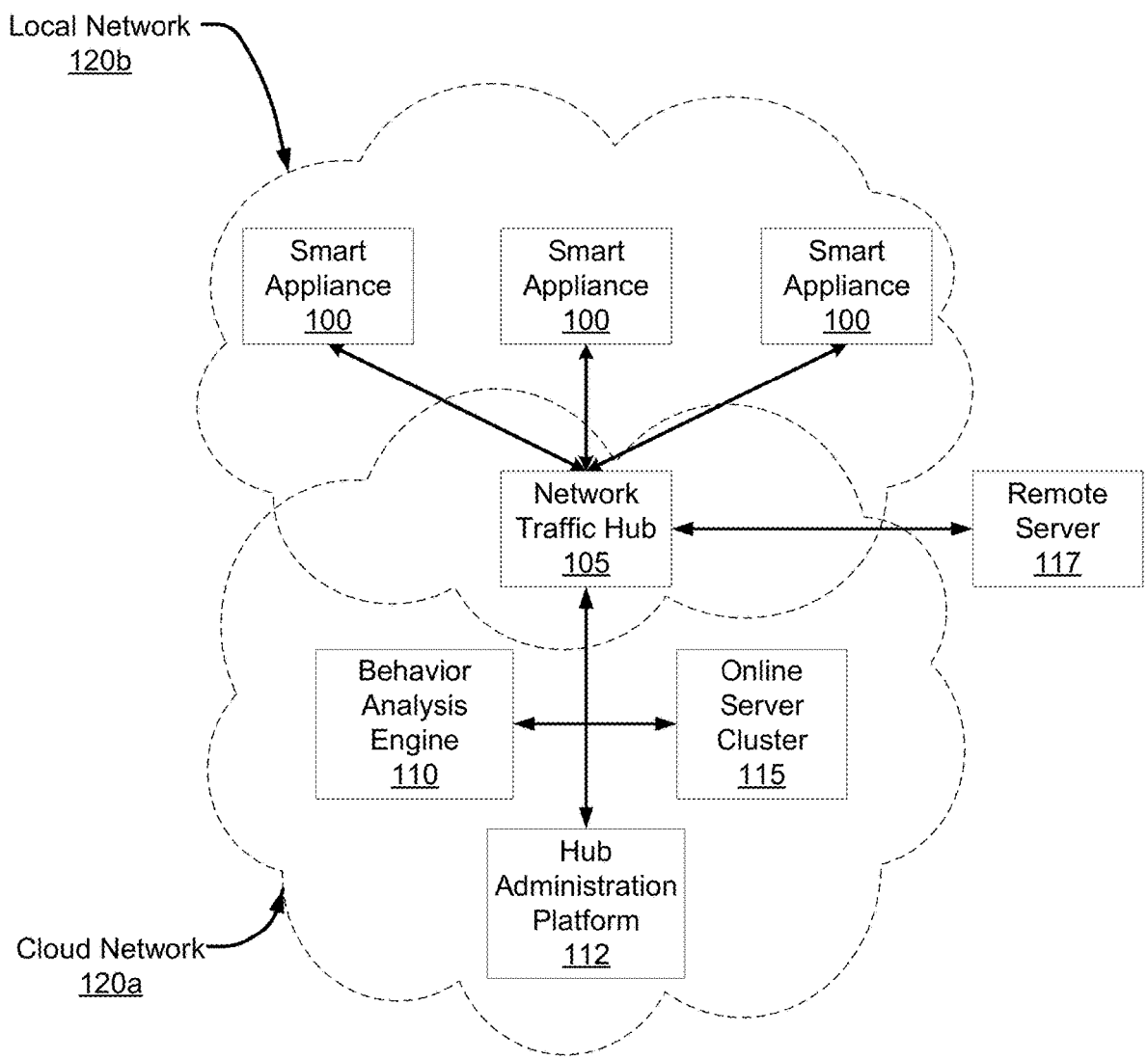
FIG. 1 illustrates a networked computing environment, in accordance with example embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In an example configuration, a network traffic hub may be configured to passively inspect messages or communication packets establishing an encrypted connection between a smart appliance and a remote server to determine whether malicious behavior is present in the messages. For example, the network traffic hub may receive a first network communication packet from a smart appliance that includes an encryption cipher suite describing encryption algorithms the smart appliance can use to encrypt communications with a remote server. The network traffic hub can extract, without modifying, the encryption cipher suite from the first network communication and then transmit the first network communication to the remote server. Similarly, the network traffic hub may passively inspect additional network communications from the remote server that include a public certificate and a subset of the encryption algorithms specified in the encryption cipher suite. The network traffic hub may extract, without modifying, the public certificate and the subset of encryption algorithms from the additional network communications and then transmit the additional network communications to the smart appliance. In some embodiments, the network communications are handshaking messages used to establish encrypted connections via the Transport Layer Security (TLS) protocol or the Secure Sockets Layer (SSL) protocol. Other attributes (also referred to as "features") of the handshaking messages used to establish encrypted connections (e.g., via the TLS or SSL protocol) may be extracted and used for classification, such as extended validation, SNI (Server Name Identification), certificate authority, certificate chain, cipher suites allowed by the smart appliance or remote server, attributes of the remote servers public certificate, and data derived from inspecting the public certificate of the remote server.

The network traffic hub can use the encryption cipher suite, the public certificate, and the encryption algorithms to detect malicious behavior in the network communications. In some embodiments, the network traffic hub may use a threat-detection model to detect the malicious behavior. The threat detection model can be a machine-learned model generated by a behavior analysis engine in communication with the network traffic hub using known-malicious training data and known-benign training data. The network traffic hub may transmit the encryption cipher suite, the public certificate, and the subset of the encryption algorithms to the behavior analysis engine for analysis using the threat detection model. The behavior analysis engine may then transmit a designation for whether malicious behavior is present in the network communications. In alternate embodiments, the behavior analysis engine generates a copy or a simplified version (if processing power is limited) of the threat detection model and transmits the threat detection model to the network traffic hub. The network traffic hub can use the threat detection model to detect malicious behavior in network communications between smart appliances in the local network and remote servers that establish encrypted communications between the smart appliances and the remote servers.

If malicious behavior is detected in the network communications establishing a secure connection between a smart appliance and a remote server, the network traffic hub may block network traffic between the smart appliance and the remote server. In some embodiments, the network traffic hub blocks traffic by resetting the connection (e.g., by a forged Transmission Control Protocol (TCP) reset) between the smart appliance and the remote server. In some embodiments, the network traffic hub may notify a user of the smart appliance that the malicious behavior has been detected and then may block network traffic between the smart appliance and the remote server in response to instructions to do so from the user.

The network traffic hub can thus effectively identify security threats to smart appliances or to remote servers while an encrypted connection is being established without additional overhead to the smart appliance or the remote server. Additionally, by using a machine-learned threat detection model that can be trained over time with new training data, the network traffic hub can adapt to identify new threats and protect a user from malicious behavior. Furthermore, by using a simplified version of the threat detection model, the network traffic hub can detect malicious behavior locally and without transmitting additional information to a behavior analysis engine for real-time detection of security threats, thereby reducing the amount of network resources used by the network traffic hub.

Although the disclosure herein refers to detecting and blocking malicious behavior based on network communications establishing an encrypted connection between a smart appliance and a remote server, this is for exemplary purposes. The principles described herein can be applied more broadly to any network communications establishing an encrypted connection between a general computing system and a remote server. For example, the network traffic hub can be used to detect and terminate malicious behavior from phishing attacks, malware drop sites, and malware command and control attacks targeting personal computers, laptops, mobile phones, and tablets. Additionally, through the network communications, the network traffic hub may detect and block encrypted communications used to mask phishing, social engineering scams, and malware delivery.

Example System Environment and Architecture

Referring now to FIG. 1, it shows a block diagram of a networked computing environment in accordance with example embodiments. The functionality of the modules in FIG. 1 can be performed by additional, fewer, or different modules and the functionality of the modules can be divvied between modules differently from how it is described below. The networked computing environment in FIG. 1 shows one or more smart appliances 100, a network traffic hub 105, a behavior analysis engine 110, a hub administration platform 112, an online server cluster 115, a remote server 117, and a cloud network 120a, and a local network 120b.

Smart appliances 100 may be electronic, networked devices with a limited level of intelligence and processing capabilities. For example, they often lack complex processors and large memory sizes, for example, due to their designed limited functionality and product cost considerations. More particularly, smart appliances 100 are capable of performing moderate amounts of computation that is specific, but limited in scope. To that extent smart appliances 100 are not full-fledged highly computational computing systems capable of complex processing, such as personal computers, smartphones, or tablets. Instead, each smart appliance 100 performs some specific role and the limited intelligence is focused on having the smart appliance 100 perform that specific role effectively. Accordingly, a smart appliance 100 does not have extensive computing resources, e.g., a powerful processor or large quantity of memory. Moreover, keeping computing resources minimal helps keep costs down for the appliances, many of which are staples, for example, in homes or small offices. Examples of appliances that can be smart appliances 100 are refrigerators, freezers, dishwashers, washers, dryers, thermostats, digital video recorders (DVRs), DVD players, and printers. A smart appliance 100 typically includes a controller or low power processor (generally, processor), a limited amount of memory, and a network interface, which is used to communicate with other networked devices.

The smart appliances 100 can use local network 120b to communicate with other devices. For example, a smart dishwasher can be configured to transmit an alert to a computer or a smartphone on the local network 120b that its cleaning cycle is completed. As another example, a smart light switch can be configured to communicate with a motion sensor via the local network 120b to determine if a person is in a room and whether to power the lights in that room. The smart appliances 100 can also communicate with devices outside of local network 120b via the internet, such as the remote server 117. A smart appliance 100 can, for example, be configured to receive software updates from remote servers 117 to improve or update is current control functions. Additionally, a smart appliance might receive data from the remote server 117 via the internet that it uses to make decisions (e.g., a smart thermostat might receive weather data to determine heating and cooling settings for a building). In some embodiments, a smart appliance 100 can be configured to receive instructions from a remote server 117 via the internet. For example, a smart clock can be configured to receive an instruction from a known server to change the time it displays when daylight savings starts or ends.

A smart appliance 100 may also transmit and receive encrypted traffic to/from the remote server 117. To transmit the encrypted traffic, the smart appliance 100 establishes an encrypted connection with the remote server 117. The smart appliance 100 and the remote server 117 agree on parameters for encrypting traffic, for example, an encryption algorithm and cipher suite. This functionality is described further below.

The network traffic hub 105 collects information about the local network 120b, including data about the network traffic through local network 120b and data identifying the smart appliances 100 in the local network 120b. The network traffic hub 105 is also capable of receiving traffic control instructions from the behavior analysis engine 110 and processing network traffic through the local network 120b based on the traffic control instructions. Processing the network traffic through the local network 120b can include restricting where network traffic can travel, blocking network traffic from entering the local network 120b, redirecting a copy of network traffic packets or features of those packets to the behavioral analysis engine 110 for analysis for malicious behavior, or quarantining the network traffic to be reviewed by a user or network administrator. In some embodiments, the functionality of the network traffic hub 105 is performed by a device that is a part of the local network 120b. In other embodiments, some or all of the functionality of the network traffic hub 105 is performed in the cloud network 120a by the online server cluster 115. In some embodiments, the network traffic hub 105 extracts, without modifying, encryption metadata from messages establishing an encrypted connection between a smart appliance 100 and a remote server 117, and transmits the encryption metadata to the behavior analysis engine 110. This functionality is further described below.

The network traffic hub 105 may be configured to monitor traffic that travels through the local network 120b. In some embodiments, the network traffic hub 105 can be a device that is a part of the local network 120b. The network traffic hub 105 can be connected to the local network 120b using a wired connection (e.g. via an Ethernet cable connected to a router) or using a wireless connection (e.g. via a Wi-Fi connection). In some embodiments, the network traffic hub 105 can comprise multiple devices in the local network 120b that, in conjunction, monitor all traffic that flows through the local network 120b. In some embodiments, the network traffic hub 105 performs the functions of a router for the local network 120b.

In some embodiments, the network traffic hub 105 performs the function of a router in the local network 120b. In some embodiments, the network traffic hub 105 intercepts traffic in the local network 120b by signaling the smart appliances 100 that the network traffic hub 105 is a router. In some embodiments, the network traffic hub 105 replaces the default gateway of the local network 120b with its own interne address. For example, the network traffic hub 105 may replace the default gateway of the local network 120b using an address resolution protocol (ARP) or dynamic host configuration protocol (DHCP) man-in-the-middle attack. To perform the man-in-the-middle attack, the network traffic hub 105 may use address resolution protocol (ARP) spoofing/cache poisoning to replace the default gateway. An address resolution protocol (ARP) announcement is sent to signal the smart appliances 100 to transmit network traffic to the network traffic hub 105. In some embodiments, the network traffic hub 105 uses an interne control message protocol (ICMP) attack to replace the default gateway. The network traffic hub 105 also may use a DHCP attack or port stealing to replace the default gateway.

In some embodiments, the local network 120b can be structured such that all network traffic passes through the network traffic hub 105, allowing the network traffic hub 105 to physically intercept the network traffic. For example, the network traffic hub 105 may serve as a bridge through which all network traffic must travel to reach the router of the local network 120b.

The behavior analysis engine 110 is configured to receive appliance traffic data and appliance identification data from the network traffic hub 105. The behavior analysis engine uses that data to determine whether any of the smart appliances 100 in the local network 120b are exhibiting malicious behavior. If the behavior analysis engine 110 is confident that a smart appliance 100 is exhibiting malicious behavior, then the behavior analysis engine 110 sends traffic control instructions to the network traffic hub 105 to block traffic to the smart appliance 100. In some embodiments, the behavior analysis engine 110 is a part of a cloud network 120a and is stored and executed by an online server cluster 115. In some embodiments, the behavior analysis engine 110 uses encryption metadata extracted from messages establishing an encrypted connection to determine whether traffic associated with the smart appliances 100 is threatened by malicious behavior inside or outside of the local network 120b. This functionality is further described below.

Developers (or third-party administrators) of the network traffic hub 105 may communicate with the network traffic hub 105 to receive diagnostic information for troubleshooting purposes or to update the firmware or software on the network traffic hub 105. In some embodiments, the developers or third-party administrators may use a secure shell (SSH) to communicate with the network traffic hub 105 using the internet address of the network traffic hub 105. In other embodiments, the developers may use the hub administration platform 112 to communicate with the network traffic hub 105 for better load-balancing and security. In these embodiments, a developer can request that the hub administration platform 112 send a security key to the network traffic hub 105. The hub administration platform 112 sends the security key to the network traffic hub 105 and adds the internet address of the network traffic hub 105 to a list of internet addresses that are allowed to communicate with the hub administration platform 112 (e.g., a firewall). Upon receiving the security key from the hub administration platform 112, the network traffic hub 105 connects to the hub administration platform 112 to communicate with the developer. After the communication between the network traffic hub 105 and the developer is finished, the hub administration platform 112 removes the internet address of the network traffic hub 105 from the list of internet addresses and the security key expires.

The online server cluster 115 is configured to store data, perform computations, and transmit data to other devices through cloud network 120a. The online server cluster 115 may comprise a single computing device, or a plurality of computing devices configured to allow for distributed computations. In some embodiments, the behavior analysis engine 110 is stored and executed by the online server cluster 115. In some embodiments, certain functionality of the network traffic hub 105 is performed on the online server cluster 115. In some embodiments, the online server cluster 115 stores data that is used by the behavior analysis engine 110 and the network traffic hub 105.

The remote server 117 may be one or more machines that can provide information to the smart appliances 100. The remote server 117 can provide information to a smart appliance 100 that the smart appliance 100 uses in normal operation. For example, if the smart appliance 100 is a smart thermostat and needs weather forecast information, the remote server 117 may be part of a weather service and may provide weather forecast information to the smart appliance 100. The remote server 117 may also provide updated software or firmware to the smart appliance 100 to improve the functionality of the smart appliance 100. The remote server 117 can be connected to the cloud network 120a or the local network 120b via the internet and, in some embodiments, is a part of the cloud network 120a or the local network 120b. The remote server 117 communicates with the smart appliances 100 through the network traffic hub 105, and is configured to encrypt traffic sent to the smart appliances 100. The establishment of an encrypted connection between a remote server 117 and a smart appliance 100 is discussed further below.

The networked computing environment in FIG. 1 may be grouped around the network traffic hub 105. In some embodiments, the network traffic hub 105 is part of cloud network 120a. In other embodiments, the network traffic hub 105 is part of a local network 120b. The cloud network 120a comprises the behavior analysis engine 110, the online server cluster 115 and, in some embodiments, the network traffic hub 105. The cloud network 120a is connected to the local network 120b via the internet. The local network 120b comprises the smart appliances 100. In some embodiments, some or all of the functionality of the network traffic hub 105 is performed by a device in the local network 120b. The local network 120b may be used for a number of purposes, including a home network or a network used by a business. The local network 120b is connected to the internet, allowing devices within the local network 120b, including smart appliances 100, to communicate with devices outside of the local network 120b. The local network 120b is connected to cloud network 120a via the internet. The local network 120b may be a private network that may require devices to present credentials to join the network, or it may be a public network allowing any device to join. In some embodiments, other devices, like personal computers, smartphones, or tablets, may join local network 120b.

The cloud network 120a and the local network 120b may comprise any combination of local area and wide area networks, using both wired and wireless communication systems. In some embodiments, the cloud network 120a and the local network 120b use standard communications technologies and protocols. For example, the cloud network 120a and the local network 120b may include communication links using technologies such as Ethernet, 802.11, worldwide interoperability for microwave access (WiMAX), 3G, 4G, code division multiple access (CDMA), digital subscriber line (DSL), etc. Data exchanged over the cloud network 120a and the local network 120b may be represented using any suitable format, such as hypertext markup language (HTML) or extensible markup language (XML). In some embodiments, all or some of the communication links of the cloud network 120a and the local network 120b may be encrypted using any suitable technique or techniques.

Extracting Encryption Metadata

Figure 2:
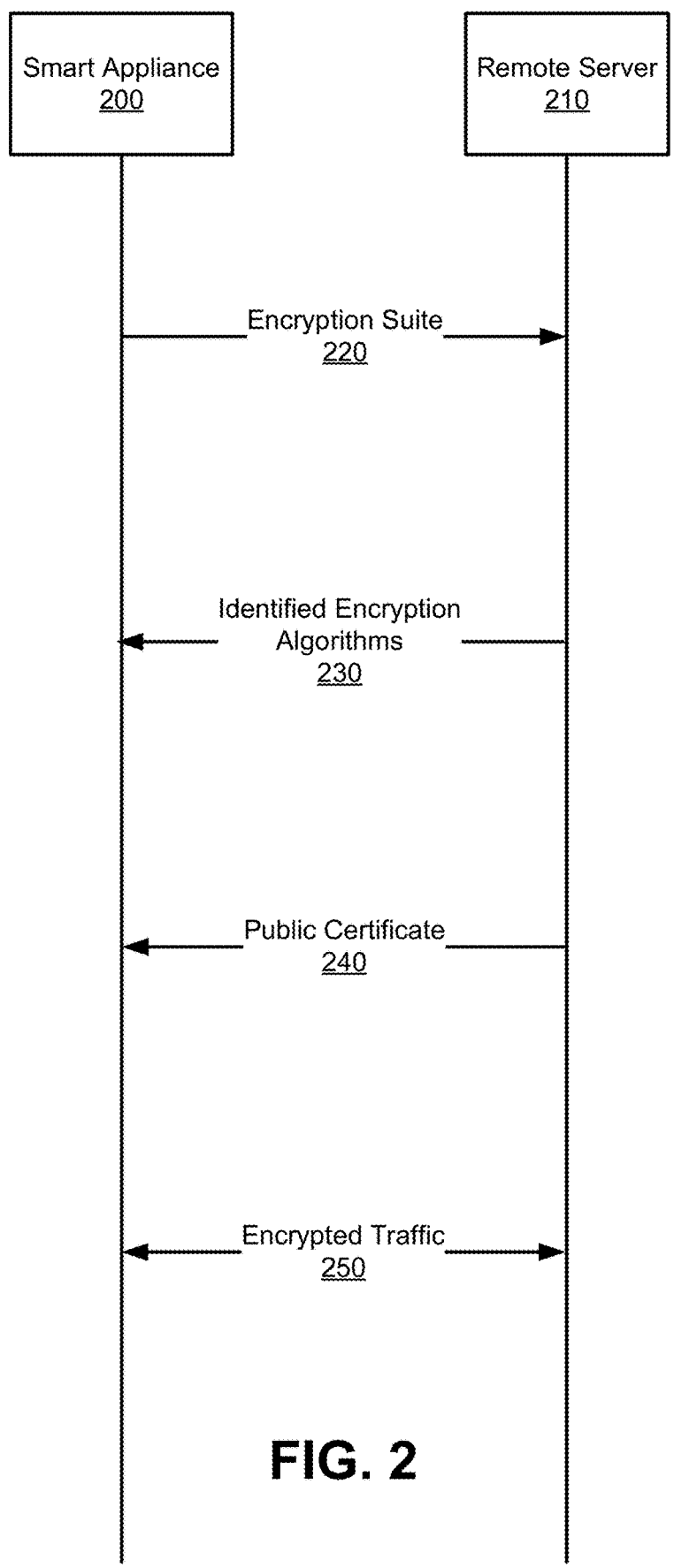
FIG. 2 illustrates a method by which a smart appliance established an encrypted connection with a remote server, in accordance with example embodiments.

FIG. 2 illustrates a method by which a smart appliance 200 establishes an encrypted connection with a remote server 210, in accordance with example embodiments. Alternate embodiments may include more, fewer, or different components and the functionality may be divided between the components differently from the description below. Additionally, alternate embodiments may include more, fewer, or different steps, and the steps may be performed in a different order from the one presented in FIG. 2.

In a conventional system environment, a smart appliance 200 communicates directly with a remote server 210 over a network (e.g., the cloud network 120a or the local network 120b) to establish an encrypted connection. The smart appliance 200 may use a cryptographic protocol, such as the Secure Sockets Layer (SSL) protocol or the Transport Layer Security protocol (TLS), to establish a secure, encrypted connection with the remote server 210.

The smart appliance 200 stores an encryption cipher suite 220 and transmits the encryption cipher suite 220 to the remote server 210. In embodiments where the TLS or SSL protocols are used, the encryption cipher suite 220 can be included in a "client hello" message. The encryption cipher suite 220 contains one or more encryption algorithms that the smart appliance 200 can use to encrypt communications to the remote server 210. Example encryption cipher suites include:
TLS_ECDHE_RSA_WITH_AES_128_GCM_SHA256
TLS_RSA_WITH_AES_128_CBC_SHA256
TLS_ECDHE_RSA_WITH_AES_128_CBC_SHA256
TLS_DHE_DSS_WITH_AES_128_CBC_SHA256
TLS_RSA_WITH_AES_128_GCM_SHA256
TLS_DH_RSA_WITH_AES_128_GCM_SHA256

In some embodiments, the encryption cipher suite 220 includes flags that designate which of a set of encryption algorithms the smart appliance 200 can use to encrypt communications.

The remote server 210 receives the encryption cipher suite 220 and identifies which of the encryption algorithms in the encryption cipher suite 220 the remote server 210 can use to encrypt communications to the smart appliance 200. In some embodiments, the encryption algorithms are identified based on which encryption algorithms the remote server 210 is capable of using for encryption communications to the smart appliance. The encryption algorithms may also be identified based on how secure each encryption algorithm is. The remote server 210 transmits the identified encryption algorithms that the remote server can use to encrypt communications to the smart appliance 200.

In addition, the remote server 210 may transmit a public certificate 240 identifying the remote server 210. In embodiments where the TLS or SSL protocols are used, the public certificate 240 and identified encryption algorithms 230 can be included in a "server hello" message. The public certificate 240 can include an identifier for an entity that issued the public certificate 240, an identifier for a domain to which the public certificate 240 is issued, a start and end time/date for when the public certificate 240 is valid, and an encryption method used to create the public certificate 240. The public certificate 240 may include a public cipher key for the remote server 210, which the smart appliance 200 uses to encrypt communications to the remote server 210. This is referred to as asymmetric encryption and can be used in TLS and SSL protocols. The public certificate 240 may also be registered with a third-party entity to verify its validity. In some embodiments, the remote server 210 may transmit the public certificate 240 with the identified encryption algorithms 230, and in other embodiments, the public certificate 240 is transmitted separately from the identified encryption algorithms. In some embodiments, the smart appliance 200 sends a public certificate to the remote server 210, for example, during TLS client authentication. This may be in response to a "client certificate request" from the remote server 210.

The smart appliance 200 and the remote server 210 begin to send encrypted traffic 250 to one another using one or more of the identified encryption algorithms 230. In some embodiments, the smart appliance 200 may encrypt a message containing an encryption key for the smart appliance 200 using the remote server's 210 public key. The smart appliance 200 transmits the encryption key to the remote server 210, and the remote server 210 uses the encryption key to encrypt messages to the smart appliance 200. The smart appliance 200 may use a single encryption key or may generate a new encryption key (e.g. using a random number generator) each time the smart appliance 200 connects to a new remote server. In embodiments where the TLS or SSL protocols are used, the encrypted traffic 250 can include "client done" and "server done" messages.

The method of establishing encrypted communications between the smart appliance 200 and the remote server 210 described in FIG. 2 is at risk to significant security threats, for example, man-in-the-middle attacks phishing, malware drop, malware command and control and others. As the encryption cipher suite 220, identified encryption algorithms 230, and public certificate 240 are transmitted unencrypted, a man-in-the-middle attacker may intercept these messages and may perform malicious behavior based on the encryption metadata. For example, a man-in-the-middle attacker may force the smart appliance 200 and the remote server 210 to use the least secure encryption algorithm in the encryption cipher suite 220, and may decrypt the encrypted traffic 250 between the smart appliance 200 and the remote server 210. In another example, a man-in-the-middle attack is performed by injecting an invalid public certificate 240 in the network communications. If the smart appliance 200 does not verify the public certificate 240 or ignores SSL or TLS warnings (as provided by a SSL or TLS encryption library), then the smart appliance 200 will communicate with a malicious endpoint.

Figure 3:
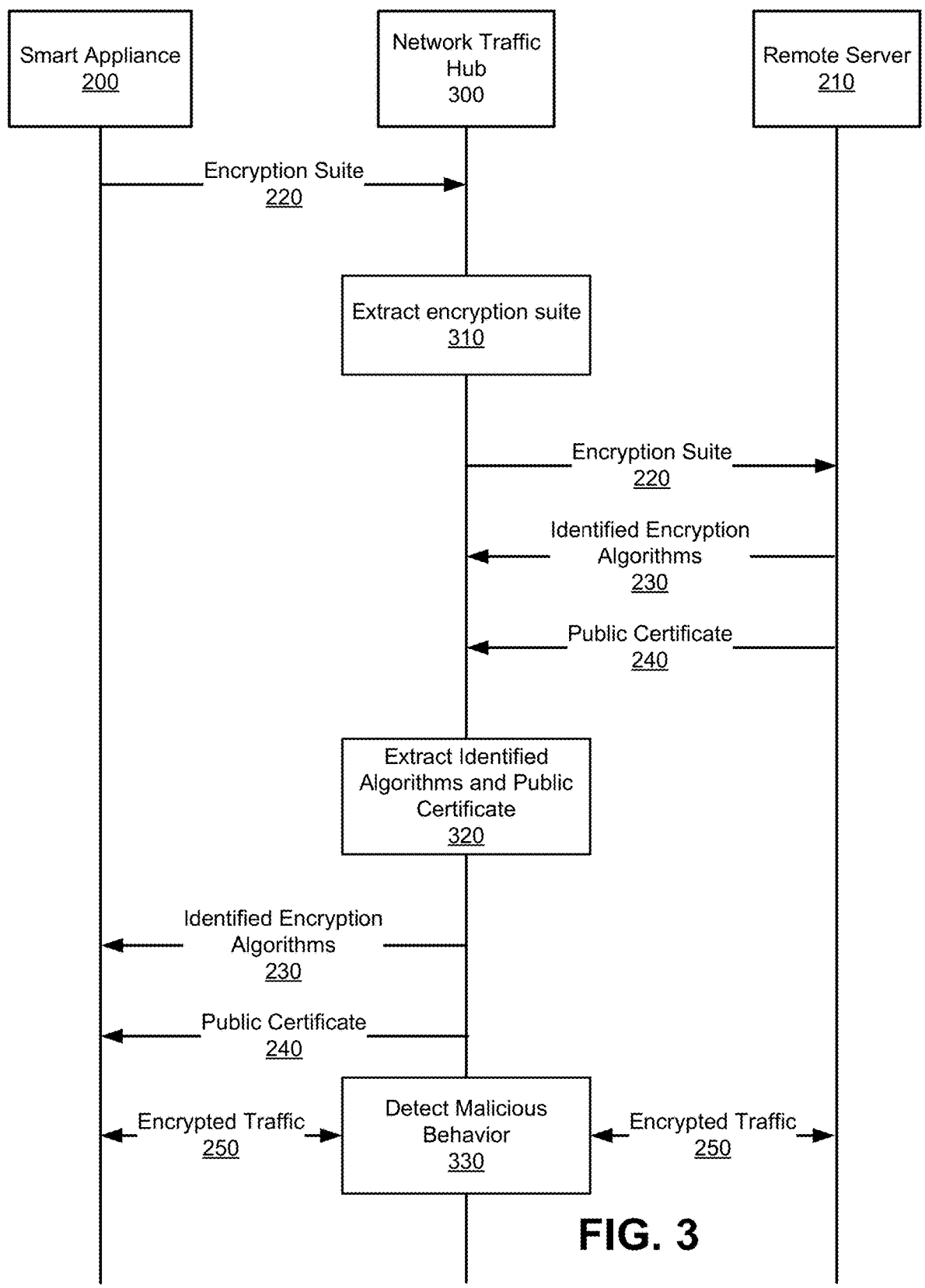
FIG. 3 illustrates a smart appliance and a remote server establishing encrypted communication through a network traffic hub, in accordance with example embodiments.

FIG. 3 illustrates an improved method of establishing encrypted communications wherein a smart appliance 200 and a remote server 210 establish an encrypted connection through a network traffic hub 300, in accordance with example embodiments. Alternate example embodiments may include more, fewer, or different components and the functionality may be divided between the components differently from the description below. For example, a man-in-the-middle attacker may receive messages sent between the network traffic hub 300 and the remote server 210. Additionally, alternate embodiments may include more, fewer, or different steps, and the steps may be performed in a different order from the one presented in FIG. 3.

The network traffic hub 300 extracts, without modifying, encryption metadata from messages establishing an encrypted connection between the smart appliance 200 and the remote server 210. For example, the network traffic hub 300 can extract 310 the encryption cipher suite 220 from the message containing the encryption cipher suite 220 and can extract 320 the identified encryption algorithms 230 and the public certificate 240 from the message or messages containing the identified encryption algorithms 230 and the public certificate 240. In some embodiments, other encryption metadata may be extracted and used for classification, such as extended validation, SNI (Server Name Identification), certificate authority, certificate chain, cipher suites allowed by the smart appliance and remote server, attributes of the remote servers public certificate, and data derived from inspecting the public certificate of the remote server.

The network traffic hub 300 may detect 330 malicious behavior or security threats based on the encryption metadata. For example, if the smart appliance 200 is using a weak encryption algorithm to encrypt traffic with the remote server 210, then the network traffic hub 300 may detect that the weak encryption algorithm is being used and may notify a user of the smart appliance 200 or may block the encrypted traffic 250. Additionally, the network traffic hub 300 also may determine whether the public certificate 240 is valid for the remote server 210, and if not, the network traffic hub 300 may notify the user that the public certificate 240 is invalid or may block the encrypted traffic 250. The network traffic hub 300 also may detect an attack from a man-in-the-middle attacker if, for example, the public certificate is invalid or a weak encryption algorithm seems to be selected by the remote server 210. In some embodiments, the network traffic hub 300 may detect malicious behavior while the smart appliance 200 and the remote server 210 are establishing the encrypted connection. For example, if the network traffic hub 300 detects that the smart appliance 200 is repeatedly sending the encryption cipher suite 220 to the remote server 210 with encryption algorithms of decreasing security (e.g. as performed in a Padding Oracle On Downgraded Legacy Encryption or "POODLE" attack), the network traffic hub 300 may prevent detection of the potential malicious behavior and may notify the user or prevent the smart appliance 200 from establishing the encrypted connection. Additionally, if the network traffic hub 300 detects a buffer over-read attack (e.g. as performed in a Heartbleed attack), the network traffic hub 300 can detect the incorrect values provided in the buffer over-read attack and notify the user of the malicious behavior or block the associated network traffic.

As previously discussed, the methods illustrated by FIG. 2 and FIG. 3 may have additional, fewer, or different communication steps to establish an encrypted connection between the smart appliance 200 and remote server. For example, in a typical SSL or TLS handshake, "client hello", "server hello", "client certificate request", "client done" and "server done" messages may be included in the communication steps to establish an encrypted connection.

Detecting Malicious Behavior Based on Encryption Metadata

Figure 4:
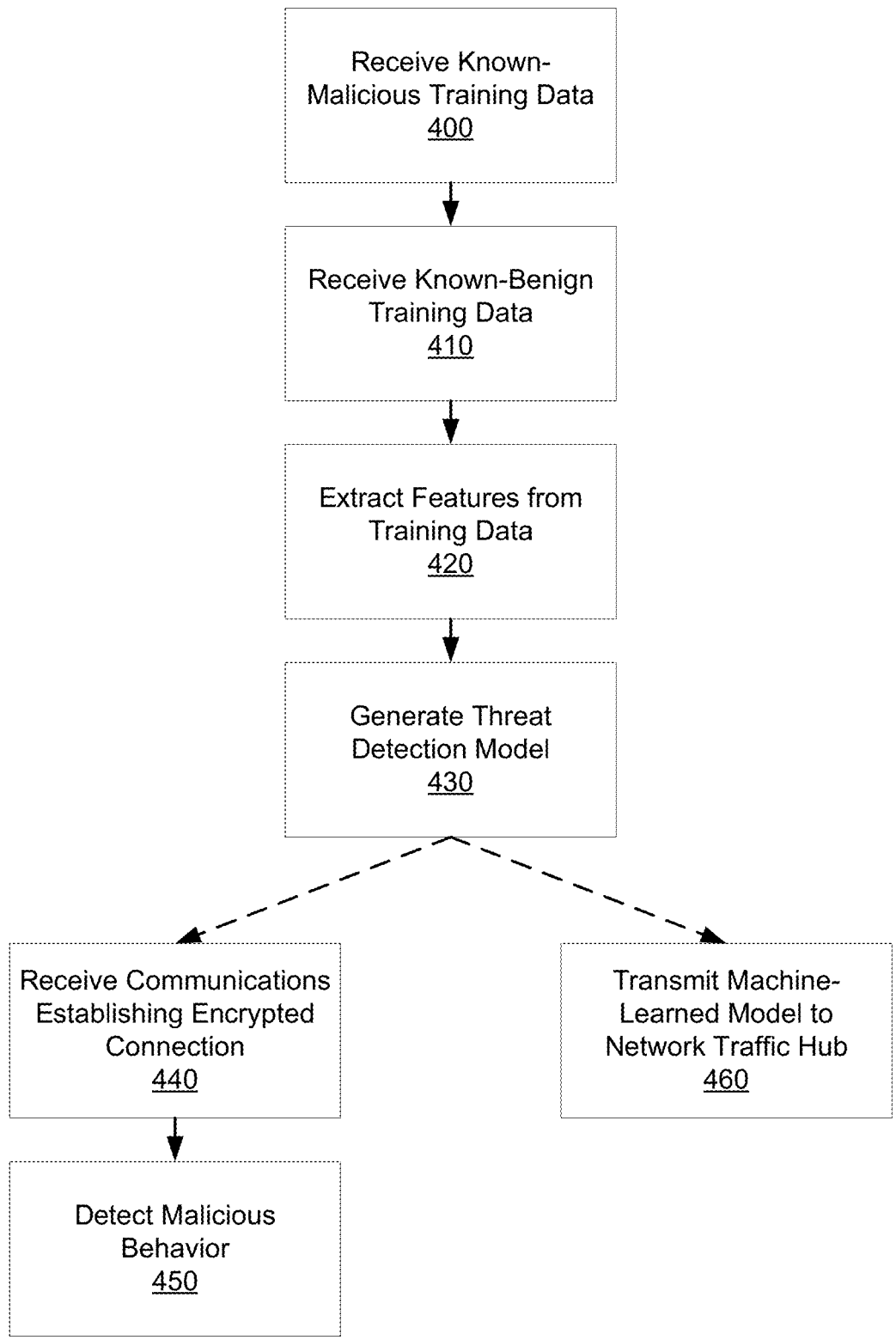
FIG. 4 is a flow diagram that illustrates methods for generating a threat detection model, in accordance with example embodiments.

FIG. 4 is a flow diagram that illustrates methods for generating a threat detection model, in accordance with example embodiments. A behavior analysis engine receives 400 known-malicious training data. The known-malicious training data may be received from the network traffic hub or a third-party entity. Known-malicious training data describes examples where a secure connection between a smart appliance and a remote server is attacked while the secure connection was being established or where a secure connection was encrypted with a weak encryption algorithm. Known-malicious training data can also describe examples of buffer over-read attacks or Padding Oracle on Downgraded Legacy Encryption (POODLE) attacks. In some embodiments, the known-malicious training data describes sites known to be malicious (e.g., phishing sites, malware distribution sites, command and control communications between malware and control servers). The known-malicious training data may be labeled malicious by the behavior analysis engine (e.g., if the known-malicious training data is known to describe attacks on secure connections) or may be labeled malicious by a human operator of the behavior analysis engine.

The behavior analysis engine also receives 410 known-benign training data. The known-benign training data may be received from the network traffic hub or from a third-party entity. Known-benign training data describes examples where a secure connection between a smart appliance and a remote server is successful connected without being compromised. The known-benign training data may come from known-non-malicious sites, such as sites on the list of the 10,000 most popular sites that support TLS/SSL. To generate the known-benign training data, the behavior analysis engine may establish secure connections with the known-non-malicious sites and use data from the communications that establish the encrypted connections to train the threat detection model. In some embodiments, the secure connection is established using the Transport Layer Security (TLS) or Secure Sockets Layer (SSL) protocols.

The behavior analysis engine extracts 420 features from the known-malicious training data and the known-benign training data. In some embodiments, the features are used directly by the behavior analysis engine. In some embodiments, the features are used to retrieve new features about a given handshake. For example, for a given certificate from a remote server of an organization, the behavior analysis engine can look up features in a database to get more details about the organization, such as geography, type of organization, etc. Example features extracted by the behavior analysis engine may include one or more of the following:

MAC Addresses of smart appliance
IP Addresses and Ports of the smart appliance and remote server
TLS Versions supported by the smart appliance and remote server
Cipher Suite Lengths
Lists of Cipher Suites
Server Name Indication Extension
Signature Hash Algorithms Length
List of Signature Hash Algorithms
Certificate Status Type
Application Layer Protocol Negotiation List
Signed Certificate Timestamp Extension
List of Certificates including common attributes and extensions such as common name, address, etc.

From the extracted features from the training data, the behavior analysis engine generates 430 the threat detection model. The threat detection model may be generated by the behavior analysis engine by using machine learning models such as a neural network, Support Vector Machine, a random forest tree, or a gradient boosting machine. Both linear, and non-linear relationship classifiers may be used to create the threat detection model.

The threat detection model is tested for accuracy (e.g., via false positives and false negatives) by developers of the behavior analysis engine. For example, a "10 fold cross validation" testing methodology may be used to test the threat detection model for accuracy to determine false positive rate, false negative rate, accuracy score, and an F1 score. Additionally, the threat detection model may be updated by the behavior analysis engine on a regular basis (e.g., daily, weekly, monthly) or as additional training data is received.

The behavior analysis engine uses the threat detection model to detect malicious behavior in encryption metadata. This may be done in real-time or near real-time. In some embodiments, the behavior analysis engine receives 440 communications establishing an encrypted connection from the network traffic hub, and applies the threat detection model to detect 450 malicious behavior in the encryption metadata. In some embodiments, the threat detection model generates a confidence score for whether malicious behavior is present in encryption metadata. If the confidence score for a particular handshake is less than some threshold, the classifier may send the encryption metadata for analysis by a human operator (e.g., a user or an administrator of the behavior analysis engine). The human operator can manually designate whether the encryption metadata describes malicious behavior and, if so, the threat detection model can be further trained based on the classification of the human operator.

The behavior analysis engine transmits the determination of whether malicious behavior is present in the encryption metadata to the network traffic hub. If malicious behavior is detected in a secure connection that is being established between a smart appliance and a remote server, the network traffic hub may block network traffic associated with the smart appliance or the remote server. In some embodiments, the network traffic hub resets the connection (e.g., by a TCP reset), effectively blocking network traffic until a confirmation is received from a user to allow the network traffic.

Alternatively, the behavior analysis engine may also transmit 460 the threat detection model to the network traffic hub. The network traffic hub uses the threat detection model to determine locally whether encryption metadata describes malicious behavior. In some embodiments, a compressed or potentially simplified version of the threat detection model is transmitted to the network traffic hub to reduce the computational resources required to use the threat detection model. For example, the threat detection model may be converted into a decision tree represented in a text, WL, JSON, or binary file generated by the behavior analysis engine. As the threat detection model is retrained by the behavior analysis engine with new training data, the behavior analysis engine may transmit an updated threat detection model to the network traffic hub. For example, the threat detection model may be updated by the behavior analysis engine on a regular basis (e.g., daily, weekly, monthly).

In embodiments where the threat detection model is generated into a decision tree, the network traffic hub can extract all of the feature values (the same features that were used to build the threat detection model) and use the values to traverse the decision tree. For example, if a feature X is extracted, one of the nodes in the tree may include a threshold for feature X and direct the network traffic hub one way if feature X exceeds the threshold and the other way if feature X does not. Once a tree is traversed based on all of the feature values, the final "leaf" node can indicate whether the communication is malicious or not. In some embodiments, the final "leaf" node provides a degree of certainty of maliciousness.

Architecture of Devices

Figure 5:
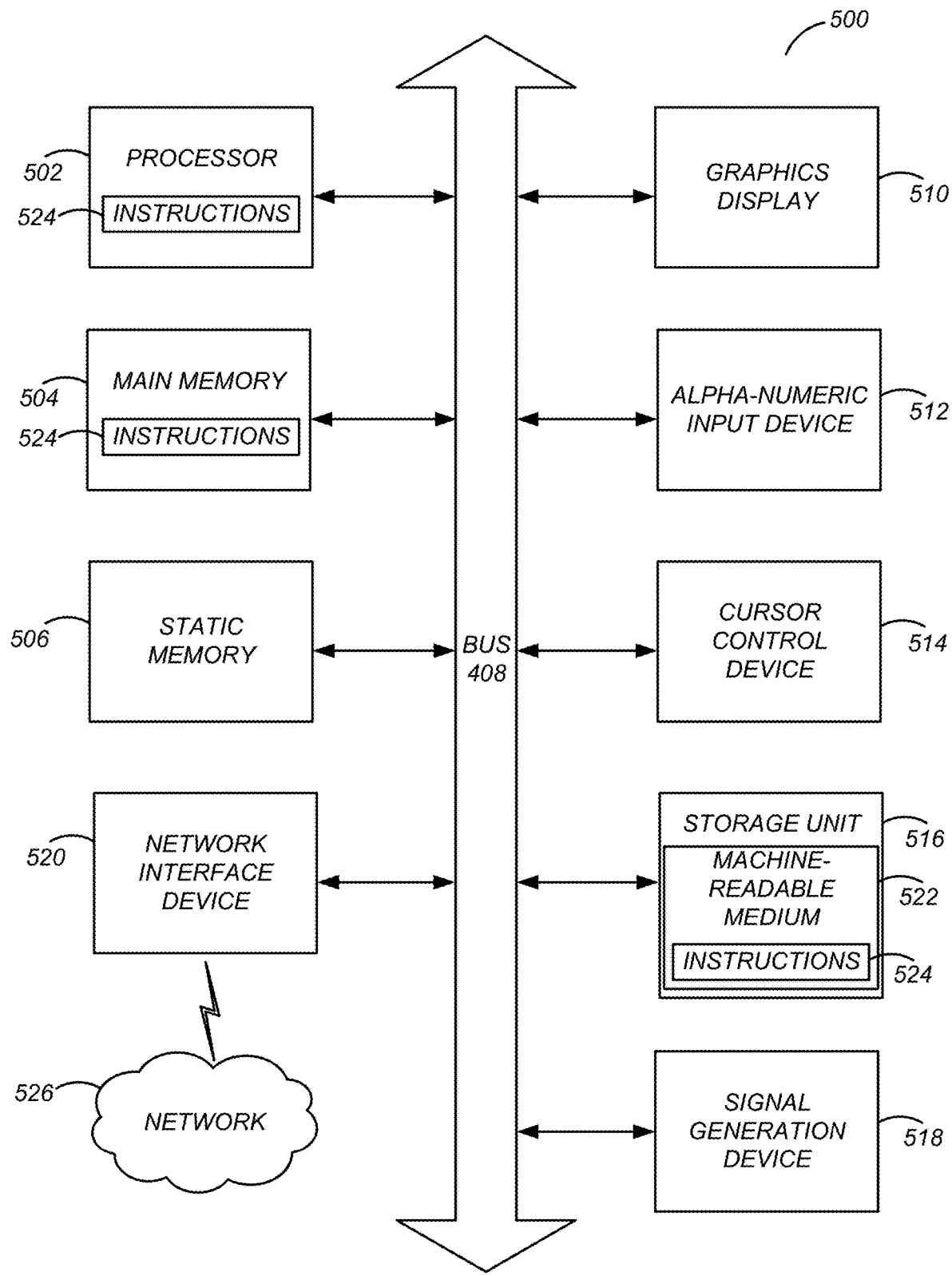
FIG. 5 is a high level block diagram illustrating an example networked device, in accordance with example embodiments.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an interne of things (IoT) appliance, a network router, a network traffic hub, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520. The network interface device 520 may include a wired or wireless network interface controller that can communicate with other networked devices via wired and/or wireless technologies. This may include Ethernet, 802.11, worldwide interoperability for microwave access (WiMAX), 3G, 4G, code division multiple access (CDMA), digital subscriber line (DSL), etc.

While machine-readable medium 522 is shown in an embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed computing configurations provide benefits and advantages that include detecting, in real-time, malicious behavior or security threats between a smart appliance and general computing devices such as personal computers (PCs), Laptops and Mobile Phones and a remote server.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, 3, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In some embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for intercepting or passively inspecting messages establishing an encrypted connection to determine whether malicious behavior is present in the messages through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein without departing from the spirit and scope defined in the appended claims.

What is claimed is:

1. A network traffic hub for detecting malicious behavior based on network communications establishing an encrypted connection between a computing system and a remote server, the network traffic hub comprising:
a network interface communicatively coupled to the computing system via a first communication channel in a local network and communicatively coupled to a remote server via a second communication channel in a wide area network;
a processor; and
a memory storing program code, the program code when executed causes the processor to:
intercept, via the first communication channel, a first network communication from the computing system for transmission, via the second communication channel, to the remote server;
transmit, via the second communication channel, the first network communication to the remote server;
intercept, via the second communication channel, one or more second network communications from the remote server to the computing system, the one or more second network communications comprising a public certificate associated with the remote server;
extract the public certificate from the one or more second network communications;
transmit, via the first communication channel, the one or more second network communications to the computing system;
detect, using a threat detection model, malicious behavior performed by the computing system or remote server, via the first and second communication channels, based on the public certificate, wherein the threat detection model comprises a machine-learned model trained using known-malicious training data and known-benign training data, the known-malicious training data comprising examples where a secure connection between a computing system and a remote server is attacked while the secure connection was being established, and the known-benign training data comprising examples where a secure connection between a computing system and a remote server is successfully connected without being compromised; and
block subsequent network communications between the computing system and the remote server in response to detecting malicious behavior in the network communications between the computing system and the remote server.

2. The network traffic hub of claim 1, further comprising program code to allow, responsive to a lack of detection of malicious behavior in the network communications between the computing system and the remote server, continued network traffic communications between the computing system and the remote server.

3. The network traffic hub of claim 1, further comprising program code to receive a designation, from a behavior analysis engine, of whether malicious behavior is present in the first network communication or the one or more second network communications based on analysis from a threat detection model.

4. A method for detecting malicious behavior based on network communications establishing an encrypted connection between a computing system and a remote server, comprising:
intercepting, by a network traffic hub in a local network, a first network communication from the computing system in the local network, for transmission to a remote server in a wide area network;
transmitting, by the network traffic hub, the first network communication to the remote server;
intercepting, by the network traffic hub, one or more second network communications from the remote server to the computing system, the one or more second network communications comprising a public certificate associated with the remote;
extracting the public certificate from the one or more second network communications;
transmitting, by the network traffic hub, the one or more second network communications to the computing system;
detecting, using a threat detection model, malicious behavior performed by the computing system or remote server, based on the public certificate, wherein the threat detection model comprises a machine-learned model trained using known-malicious training data and known-benign training data, the known-malicious training data comprising examples where a secure connection between a computing system and a remote server is attacked while the secure connection was being established, and the known-benign training data comprising examples where a secure connection between a computing system and a remote server is successfully connected without being compromised; and
blocking subsequent network communications between the computing system and the remote server, responsive to detecting malicious behavior in the network communications between the computing system and the remote server by the network traffic hub.

5. The method of claim 4, further comprising, responsive to not detecting malicious behavior in the network communications between the computing system and the remote server, allowing continued network traffic communications between the computing system and the remote server by the network traffic hub.

6. The method of claim 4, further comprising receiving, from a behavior analysis engine a designation of whether malicious behavior is present in the first network communication or the one or more second network communications based on analysis from a threat detection model.

7. A non-transitory computer-readable medium comprising stored program code, the program code comprised of computer-executable instructions that, when executed by a processor, causes the processor to:
intercept, via a first communication channel in a local network, a first network communication from a computing system for transmission, via a second communication channel in a wide area network, to a remote server;
transmit, via the second communication channel, the first network communication to the remote server;
intercept, via the second communication channel, one or more second network communications from the remote server to the computing system, the one or more second network communications comprising a public certificate associated with the remote server;
extract the public certificate from the one or more second network communications;
transmit, via the first communication channel, the one or more second network communications to the computing system;
detect, using a threat detection model, malicious behavior performed by the computing system or remote server, via the first and second communication channels, based on the public certificate, wherein the threat detection model comprises a machine-learned model trained using known-malicious training data and known-benign training data, the known-malicious training data comprising examples where a secure connection between a computing system and a remote server is attacked while the secure connection was being established, and the known-benign training data comprising examples where a secure connection between a computing system and a remote server is successfully connected without being compromised; and block network communications between the computing system and the remote server, in response to detecting malicious behavior in the network communications between the computing system and the remote server.

8. The non-transitory computer-readable medium of claim 7, further comprising, responsive to not detecting malicious behavior in the network communications between the computing system and the remote server, allowing continued network traffic communications between the computing system and the remote server.

9. The non-transitory computer-readable medium of claim 7, further comprising program code to receive a designation, from a behavior analysis engine, of whether malicious behavior is present in the first network communication or the one or more second network communications based on analysis from a threat detection model.

* * * * *